United States Patent [19]

Parsons

[11] Patent Number: 5,029,441
[45] Date of Patent: Jul. 9, 1991

[54] DYNAMIC COMPENSATION TO N-DOT SCHEDULES

[75] Inventor: Douglas A. Parsons, Enfield, Conn.
[73] Assignee: United Technologies Corporation, Hartford, Conn.
[21] Appl. No.: 409,835
[22] Filed: Sep. 20, 1989
[51] Int. Cl.$^5$ ............................................. F02C 9/28
[52] U.S. Cl. ............................ 60/39.161; 60/39.281
[58] Field of Search ......................... 60/39.161, 39.281

[56] References Cited

U.S. PATENT DOCUMENTS

| | | | |
|---|---|---|---|
| 4,188,781 | 2/1980 | Johnson et al. | 60/39.281 |
| 4,423,593 | 1/1984 | Zayranski et al. | 60/39.281 |
| 4,470,118 | 9/1984 | Morrison | 60/39.281 |
| 4,543,782 | 10/1985 | Fitzmaurice | 60/39.281 |

Primary Examiner—Louis J. Casaregola
Attorney, Agent, or Firm—Richard H. Kosakowski

[57] ABSTRACT

The speed of the gas generator of a gas turbine engine is measured and summed with the rate of change of the gas generator speed and the sum is input to a schedule which outputs desired engine acceleration as a function of gas generator speed, the input thereby providing an anticipation to the schedule output so as to result in a dynamic shift of the schedule. In an exemplary embodiment of the invention in a helicopter fuel control, the amount of anticipation provided by the schedule input allows the fuel control to accurately control the engine to the desired acceleration schedule.

5 Claims, 2 Drawing Sheets

DYNAMIC COMPENSATION TO N-DOT SCHEDULES

TECHNICAL FIELD

This invention relates to gas turbine engines, and more particularly to means for adding rate dependent information to the input of a desired engine acceleration schedule so that the actual engine acceleration better follows the desired schedule.

BACKGROUND ART

In gas turbine engine operation, it is known for the engine fuel control to provide for control during hard transients such as accelerations. Typically, the engine manufacturer specifies a desired acceleration ("N-Dot") schedule which is not flat, but of a complex shape. Part of the complexity is due to the need to avoid engine operation in the compressor stall region. The schedule input is typically the measured gas generator speed, NG.

A problem with this scheme is that the control is unable to command the engine to accurately follow the desired acceleration schedule. This is due to control design tradeoffs between bandwidth limitations which result from a overriding desire to improve the control's transient performance. The bandwidth is limited by the stability of the control along with the rise characteristics of the acceleration schedule. As a result, the engine may be undesirably operated in the stall region, which in itself may cause catastrophic engine problems.

To compensate for the poor tracking by the control of the acceleration schedule, it is known to manually shift the schedule before implementation in the control so as to avoid any undesired operating regions. However, besides consuming more time and cost during the control design phase, the manual shifting does not provide a true solution to the problem.

DISCLOSURE OF INVENTION

Objects of the present invention include provision of a gas turbine engine fuel control having means for controlling an engine to accurately follow a desired engine acceleration schedule while also avoiding undesired operating regions.

According to the present invention, the speed of the gas generator of a gas turbine engine is measured and summed with the rate of change of the gas generator speed and the sum is input to a schedule which outputs desired engine acceleration as a function of gas generator speed, the input thereby providing an anticipation to the schedule output so as to result in a dynamic shift of the schedule. In an exemplary embodiment of the invention in a helicopter fuel control, the amount of anticipation provided by the schedule input allows the fuel control to accurately control the engine to the desired acceleration schedule.

The invention may be implemented in a helicopter fuel control by means of dedicated digital or analog hardware, or may be implemented in a suitable fuel control computer by means of relatively simple program steps, utilizing only apparatus and techniques which are readily available and well known in the art, in light of the teachings which follow hereinafter. Also, the invention may be implemented in the aforementioned fashions in a fuel control for any type of gas turbine engine application, e.g., aircraft, marine.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
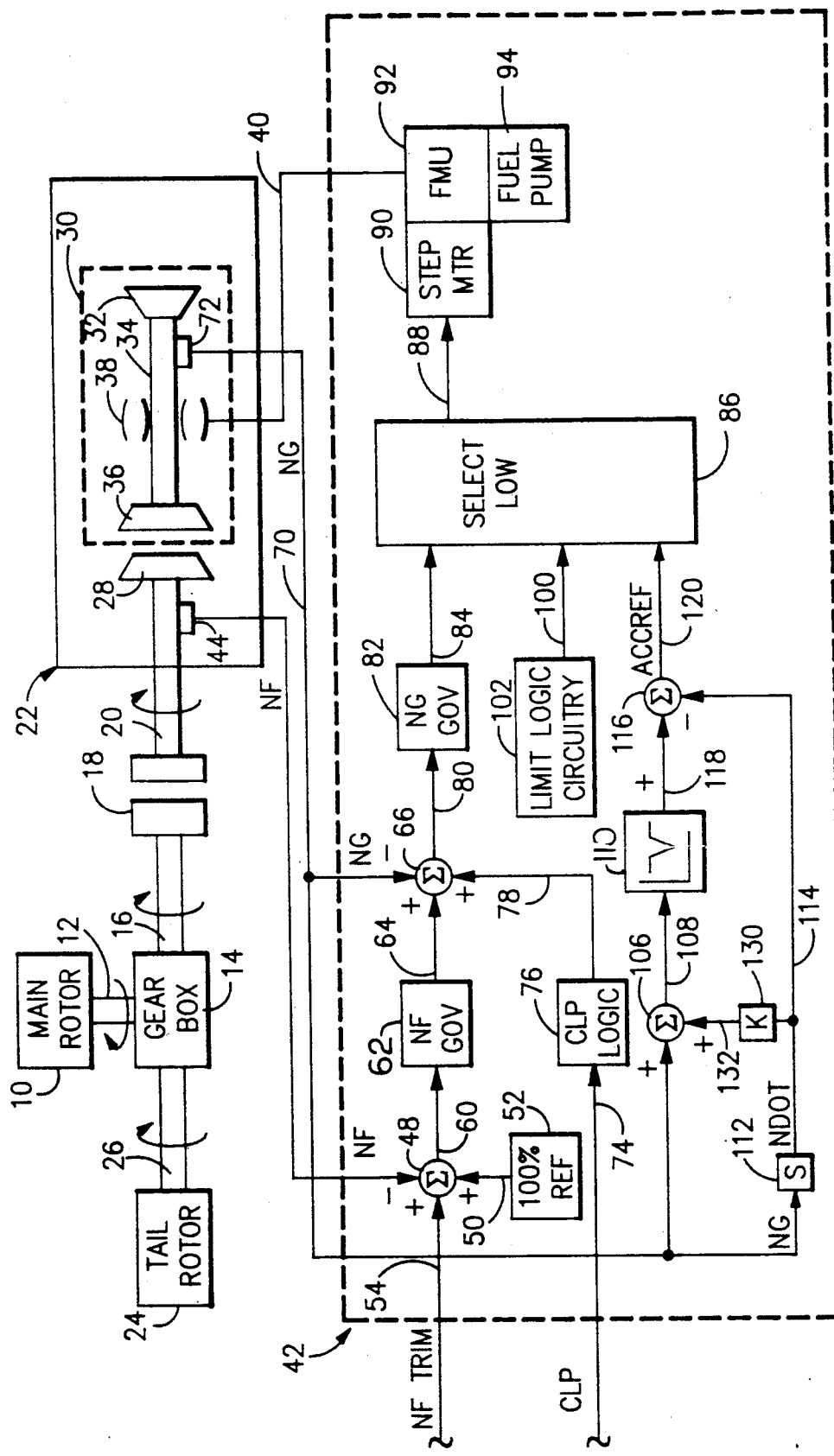
FIG. 1 is a simplified schematic block diagram of a helicopter rotor drive system including a gas turbine engine and a fuel control containing an exemplary embodiment of the present invention.

Referring to FIG. 1, a main rotor 10 of a helicopter connects through a shaft 12 to a gear box 14 which is driven by a shaft 16 through a clutch 18. The clutch 18 engages an output shaft 20 of an engine 22 when the engine speed equals or exceeds the rotor speed. The gear box 14 drives a tail rotor 24 through a shaft 26 such that the main rotor 10 and tail rotor 24 are driven at speeds in a fixed relationship to one another.

The engine 22 may typically comprise a free turbine gas engine, such as the Model PW205B manufactured by Pratt & Whitney Canada. The engine output shaft 20 is driven by a free turbine 28, which in turn is driven by gases from a gas generator 30 having a compressor 32 connected by a shaft 34 to a turbine 36, and a burner section 38 to which fuel is applied by fuel lines 40 under the control of a fuel control 42. The control 42 provides the correct fuel flow in the lines 40 to maintain a desired free turbine speed (NF) as determined by a sensor 44 which measures the rotary speed of the engine output shaft 20.

The NF sensor 44 provides an NF signal on a line 46 to a summing junction 48, whose other inputs include a reference speed signal indicative of 100% rated speed on a line 50 from a reference source 52 and an NF trim signal on a line 54 from the pilot. The output of the summing junction 48 is an NF speed error signal on a line 60 which is fed to known NF governor circuitry 62, whose output signal on a line 64 is indicative of commanded gas generator speed and is fed to a summing junction 66.

The summing junction 66 is also responsive to a signal indicative of gas generator speed (NG) on a line 70 as determined by a sensor 72 which is responsive to the rotary speed of the gas generator shaft 34. Also, a signal on a line 74 indicative of collective lever pitch (CLP) angular position from the pilot is applied to known CLP logic circuitry 76, whose output signal on a line 78 is fed to the summing junction 66. The CLP circuitry 76 may comprise proportional and/or derivative control circuitry to contribute to overall gas generator control in a suitable manner.

The output of the summing junction 66 is provided on a line 80 to known NG governor circuitry 82, whose output on a line 84 indicates a commanded fuel flow and is fed to discriminator circuitry 86 which selects the lowest commanded fuel flow from among several inputs. However, it is to be understood that the discriminator circuitry 86 may comprise types of circuitry other than select low circuitry in selecting an appropriate commanded rate of fuel flow. The output of the select low circuitry 86 on a line 88 is fed to a stepper motor 90 which controls a fuel metering unit (FMU) 92 that, in turn, controls a fuel pump 94 in metering fuel to the engine burner 38 over fuel lines 40.

The select low circuitry may also have as input a commanded fuel flow on a line 100 as determined by limit circuitry 102 that monitors engine parameters, e.g., NG, torque, and measured gas temperature, and determines limits therefrom so as to protect the engine 22 from excessive operation beyond its rated capabilities.

NG on the line 70 is also fed to a summing junction 106, whose output on a line 108 is fed to a schedule 110 of desired engine acceleration as a function of NG. NG is also fed to a derivative circuit 112 which provides a signal indicative of NG rate of change (NDOT) on a line 114 to a summing junction 116, which subtracts NDOT from the output of the acceleration schedule 110 on a line 118. The output signal (ACCREF) on a line from the summing junction 116 is a commanded fuel flow indicative of acceleration speed error and is fed to the select low circuitry 86.

Typically, the output of the NG governor circuitry 84 will be the lowest commanded fuel flow presented to the select low circuitry during helicopter hover, level flight, and gentle maneuvers. Thus, the NG governor is the primary governor for the helicopter. However, during excursions in which selected engine parameters approach engine limits, the output of the limit circuitry 102 will be the lowest commanded fuel flow to the select low circuitry, and, thus, will preempt normal NG governing. Also, during hard acceleration transients, ACCREF will be the lowest commanded fuel flow, and, thus, will preempt normal NG governing.

All of the apparatus described thus far is simply exemplary of that known in the art.

According to the invention, NDOT is also fed to a gain circuit 130 which gain modifies NDOT before presenting it on a line 132 to the summing junction 106. The summing junction 106 sums the gain modified NDOT signal with NG to provide the input to the schedule 110. As described hereinafter, this anticipatory input has the effect of dynamically shifting the acceleration schedule so as to allow the fuel control 42 to more accurately control the engine 22 to the desired acceleration schedule. However, it is to be understood that NDOT may, if desired, be fed directly to the summing junction 106 without detracting from the broadest scope of the present invention. It suffice that a signal indicative of NG rate of change be summed with NG and the sum be used as the input to the acceleration schedule.

Figure 2:
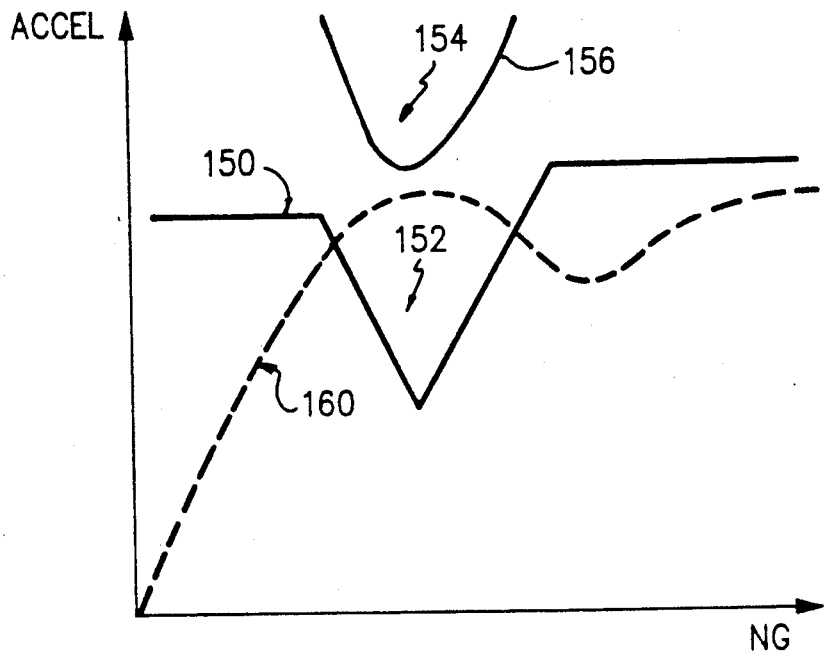
FIG. 2 is an illustration of an exemplary desired acceleration schedule waveform together with a waveform of the resulting response of a fuel control typical of that found in the prior art.

Illustrated in FIG. 2 is an exemplary waveform 150 of desired engine acceleration versus NG as provided by the manufacturer of a gas turbine engine. Typically the waveform 150 is not flat, but has a "bucket" region 152 where the desired acceleration is decreased for a range of NG so as to avoid engine operation near or in an engine compressor stall region 154 as defined by an outer boundary 156. That is, it is desired for the control 42 to operate the engine 22 with sufficient stall margin.

A fuel control similar to that of FIG. 1 without the present invention implemented therein typically follows the acceleration schedule poorly due to inherent bandwidth limitations. FIG. 2 illustrates a waveform 160 of the typical engine response in attempting to follow the desired acceleration waveform 150. The engine typically comes close to, or may even sometimes enter, the stall region 154 (i.e., an inadequate stall margin is maintained). To mitigate this problem to some extent, it is known to manually shift the desired engine acceleration schedule before implementing it within the fuel control. However, the resulting accuracy of the engine in following the desired schedule is still typically poor. Thus, it is desired to provide engine control such that the engine more accurately follows the desired acceleration schedule without the need to manually shift the schedule.

Figure 3:
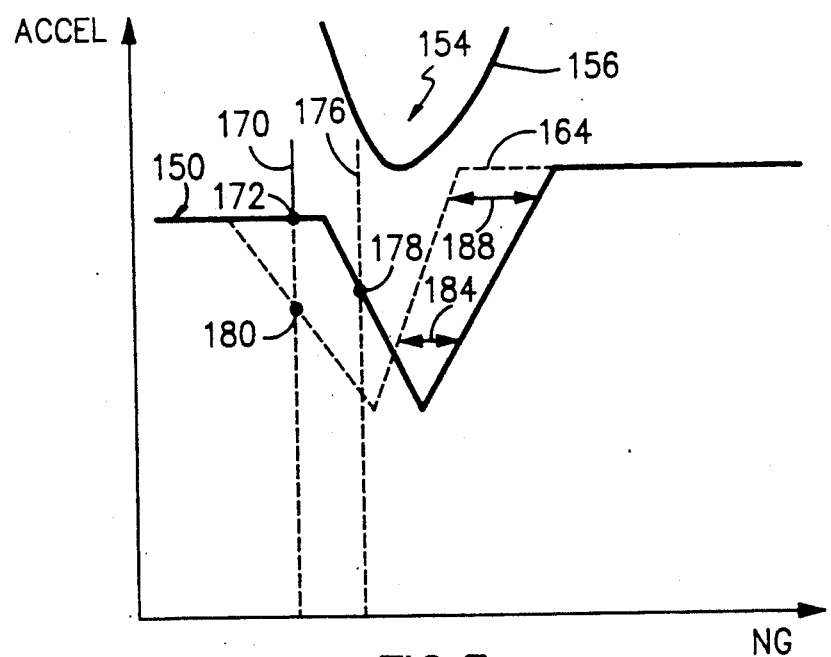
FIG. 3 is an illustration of an exemplary desired acceleration schedule waveform together with an exemplary schedule shift as accomplished by the embodiment of FIG. 1.

FIG. 3 illustrates the desired acceleration schedule waveform 150 of FIG. 2 together with the stall region 154 to be avoided. Also illustrated is a waveform 164 of the dynamic shifting of the acceleration schedule as accomplished by the present invention.

To illustrate the operation of the present invention, assume that the value of NG is indicated by a vertical line 170, which intersects the desired acceleration waveform 150 at point 172. In the prior art, the commanded acceleration fuel value along the vertical axis at point 172 would be the value output from the schedule. However, when NDOT is summed with NG in accordance with the present invention, the resulting input to the schedule is indicated by vertical line 176, which intersects the waveform 150 at point 178. Now, the commanded acceleration fuel value at point 172 is output from the schedule. Actual NG remains, however, as that indicated by the vertical line 170. Thus, for the exemplary value of NG, the commanded acceleration fuel value is, in effect, that indicated by point 180. Carrying out this analysis in a similar manner for the entire waveform 150, the shifted waveform 164 results. It can thus be seen that summing NDOT with NG provides an anticipatory input to the acceleration schedule which effectively shifts the schedule, thus compensating for the characteristics of the fuel control and the inherent lag in the engine.

In testing with the aforementioned Pratt & Whitney Canada engine, dynamically shifting the schedule in this manner allows the engine 22, with its natural lag, to accurately track the desired acceleration waveform 150, thereby maintaining adequate stall margin. Thus, the present invention avoids the problems associated with the prior art in having to manually shift the acceleration schedule before incorporation into the fuel control and in maintaining desired acceleration response with adequate stall margin.

An added result of the present invention is that the absolute level of dynamic schedule shifting is dependent on the magnitude of the acceleration schedule. For example, the difference between the shifted waveform 164 and the desired waveform 150 is greater at point 184 than at point 188, point 188 being at a greater magnitude of acceleration on the vertical axis than point 184. This allows the fuel control to more accurately control the engine over the typically wide range of desired acceleration rates.

The exemplary embodiment of the invention is described with respect to a particular rotorcraft gas turbine engine. However, the present invention may be used on other types of gas turbine engines, if desired. Also, the teachings of the invention may, if desired, be practiced on gas turbine engines that find applications outside of rotorcraft, e.g., aircraft and marine applications.

The invention is illustrated in analog form. However, the invention may be performed using software program steps in a suitable digital control computer, as exemplified by a Model EEC139 flight control manufactured by Hamilton Standard. Also, the invention may be implemented with suitable dedicated digital hardware, if desired, in an appropriate fashion which should be readily apparent to those skilled in the art in light of the description herein. All of the foregoing changes and variations are irrelevant; it suffice for the present invention that the speed of the gas generator of a gas turbine engine be measured and summed with the rate of change of the gas generator speed and the sum input to a schedule which outputs desired engine acceleration as a function of gas generator speed, the input thereby providing an anticipation to the schedule output so as to result in a dynamic shift of the schedule.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A control for a gas turbine engine having a free turbine for driving loads connected thereto and having a gas generator for driving the free turbine, comprising:

turbine speed means, for providing a turbine speed signal indicative of the actual rotary speed of the free turbine;

gas generator speed means, for providing a gas generator speed signal indicative of the actual rotary speed of the gas generator;

fuel metering means, for metering fuel to the gas generator at a rate determined by a metering command signal applied thereto; and signal processing means, responsive to said turbine speed signal and said gas generator speed signal and having discriminating means, for providing a first fuel command signal indicative of a desired rate of gas generator fuel flow in response to said turbine speed signal and said gas generator speed signal, and for providing a signal indicative of the rate of change of said gas generator speed signal, said discriminating means responsive to said first fuel command signal and one or more additional fuel command signals applied thereto for providing said metering command signal as a function of either said first fuel command signal or one of said one or more additional fuel command signals; characterized by:

said signal processing means comprising means, responsive to said gas generator speed signal, for summing said gas generator rate of change speed signal with said gas generator speed signal to provide a gas generator reference signal, for providing, in response to said gas generator reference signal, a scheduled acceleration signal indicative of a desired acceleration rate of the gas generator, and for differencing said scheduled acceleration signal and said gas generator speed rate of change signal to provide a second fuel command signal indicative of a desired rate of gas generator fuel flow, said second fuel command signal comprising one of said one or more additional fuel command signals.

2. The control of claim 1, wherein said signal processing means further comprises gain means responsive to said gas generator speed rate of change signal for multiplying said gas generator speed rate of change signal and for providing a gain multiplied gas generator rate of change speed signal indicative thereof, said signal processing means summing said gas generator speed signal with said gain multiplied gas generator rate of change speed signal to provide said gas generator reference signal.

3. The control of claim 1, wherein said discriminating means further comprises means for providing said metering command signal as a function of the lowest in magnitude of said first fuel command signal and said one or more additional fuel command signals.

4. A control for a gas turbine engine having a free turbine for driving loads connected thereto and having a gas generator for driving the free turbine, comprising:

gas generator speed means, for providing a gas generator speed signal indicative of the actual rotary speed of the gas generator;

fuel metering means, for metering fuel to the gas generator at a rate determined by a metering command signal applied thereto; and signal processing means, responsive to said gas generator speed signal, for providing a signal indicative of the rate of change of said gas generator speed signal; characterized by:

said signal processing means comprising means, responsive to said gas generator speed signal, for summing said gas generator rate of change speed signal with said gas generator speed signal to provide a gas generator reference signal, for providing, in response to said gas generator reference signal, a scheduled acceleration signal indicative of a desired acceleration rate of the gas generator, and for differencing said scheduled acceleration signal and said gas generator speed rate of change signal to provide said metering command signal, said metering command signal being indicative of a desired rate of gas generator fuel flow.

5. The control of claim 4, wherein said signal processing means further comprises gain means, responsive to said gas generator speed rate of change signal, for multiplying said gas generator speed rate of change signal and for providing a gain multiplied gas generator rate of change speed signal indicative thereof, said signal processing means summing said gas generator speed signal with said gain multiplied gas generator rate of change speed signal to provide said gas generator reference signal.

* * * * *